(12) United States Patent  
Frydman et al.

(10) Patent No.: US 8,812,609 B2  
(45) Date of Patent: Aug. 19, 2014

(54) METHODS, CIRCUITS, DEVICES, SYSTEMS AND ASSOCIATED COMPUTER EXECUTABLE CODE FOR DISTRIBUTED CONTENT CACHING AND DELIVERY

(75) Inventors: Daniel Nathan Frydman, Haifa (IL); Lior Fite, Zurit (IL)

(73) Assignee: Jaguna Networks Ltd, Yokneam Illit (IL)

( * ) Notice: Subject to any disclaimer, the term of this patent is extended or adjusted under 35 U.S.C. 154(b) by 310 days.

(21) Appl. No.: 13/324,160

(22) Filed: Dec. 13, 2011

(65) Prior Publication Data

US 2012/0311062 A1    Dec. 6, 2012

Related U.S. Application Data

(60) Provisional application No. 61/493,533, filed on Jun. 6, 2011.

(51) Int. Cl.
*G06F 15/167* (2006.01)
*G06F 15/16* (2006.01)

(52) U.S. Cl.
USPC ................... 709/212; 709/217; 709/228

(58) Field of Classification Search
None
See application file for complete search history.

(56) References Cited

U.S. PATENT DOCUMENTS

| | | | |
|---|---|---|---|
| 2009/0113068 A1* | 4/2009 | Fujihira et al. | 709/231 |
| 2009/0271502 A1* | 10/2009 | Xue et al. | 709/219 |
| 2010/0254580 A1* | 10/2010 | Plamondon | 382/124 |
| 2010/0281105 A1* | 11/2010 | Sebastian | 709/203 |

* cited by examiner

*Primary Examiner* — John B. Walsh

(74) *Attorney, Agent, or Firm* — Vladimir Sherman; Professional Patent Solutions

(57) ABSTRACT

Disclosed are methods, circuits, devices, systems and associated computer executable code for distributed content caching and delivery. An access or gateway network may include two or more gateway nodes integral or otherwise functionally associated with a caching unit. Each of the caching units may include: (a) a caching repository, (b) caching/delivery logic and (c) an inter-cache communication module. Caching logic of a given caching unit may include content characterization functionality for generating one or more characterization parameters associated with and/or derived from content entering a gateway node with which the given caching unit is integral or otherwise functionally associated. Content characterization parameters generated by a characterization module of a given caching unit may be compared with content characterization parameters of content already cached in: one or more cache repositories of the given caching unit, and one or more cache repositories of other caching units.

39 Claims, 8 Drawing Sheets

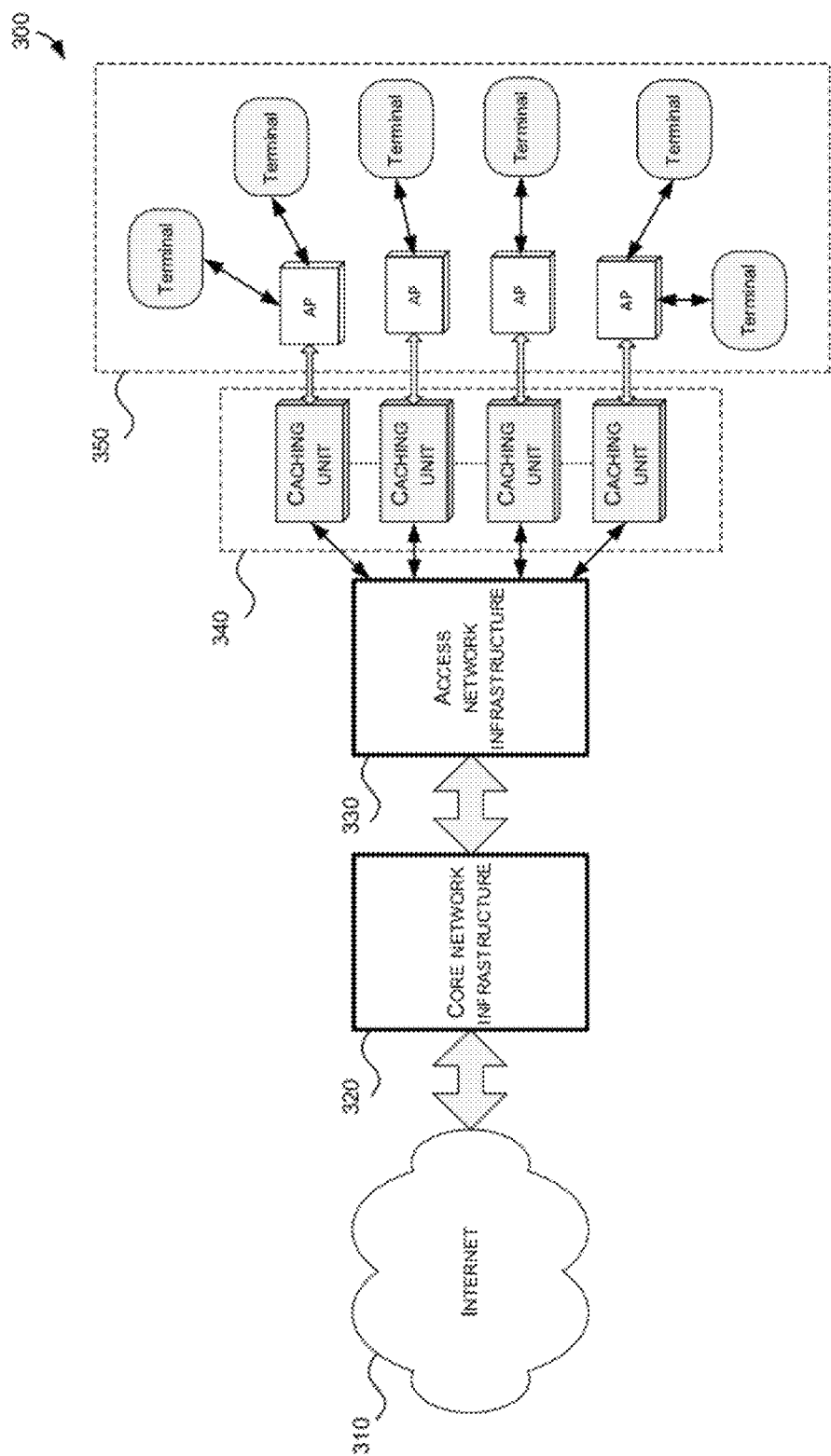

METHODS, CIRCUITS, DEVICES, SYSTEMS AND ASSOCIATED COMPUTER EXECUTABLE CODE FOR DISTRIBUTED CONTENT CACHING AND DELIVERY

CROSS REFERENCE

The present application claims the benefit of U.S. Provisional Patent Application 61/493,533 filed Jun. 6, 2011, the disclosure of which is incorporated herein by reference.

FIELD OF THE INVENTION

Some embodiments relate generally to the field of caching systems and, more particularly, to methods, circuits, devices, systems and associated computer executable code for distributed content caching and delivery.

BACKGROUND

Remote on-demand access to computer and communication network resources, including Internet access is becoming more widespread. With the Internet becoming increasingly popular, more network users are able to connect to a remote server through any device with an internet connection. Users are able to connect to the Internet from home computers, laptops, tablets, smart phones, e-book readers, and any other mobile Internet device. When connected to the internet, many users are downloading or streaming large amounts of data e.g. when watching a movie.

The growing demand for TCP/IP services over mobile networks, including streaming data rich content such as video, has created enormous bandwidth and data traffic requirements. Caching of data rich content can be an effective method for reducing the traffic load on mobile networks.

While caching data based on Uniform Resource Locators (URLs) was an effective method, modern websites and video content providers are using dynamic URLs for their content. Therefore, a URL alone cannot be used to categorize and/or classify content; content data in addition to metadata associated with the content must be analyzed for a robust caching decision algorithm.

The simplest and most straightforward caching systems are centralized within the network and employ centralized storage architecture. Shortcomings of such systems include the high cost of a robust central storage unit, data traffic congestion and limited expansion options. A more ideal caching system includes multiple caching units with adaptable storage options. Caching units installed within the network can operate within specific data load zones and can adapt to balance the caching load based on real-time caching requests. A cloud storage option allows for data to be stored and accessed from any point within the network. As the network grows, the caching system can grow with additional relatively inexpensive caching units.

There is thus a need in the field of caching systems for improved methods, circuits, devices, systems and associated computer executable code for distributed content caching and delivery.

SUMMARY OF THE INVENTION

The present invention includes methods, circuits, devices, systems and associated computer executable code for distributed content caching and delivery. According to some embodiments of the present invention, an access or gateway network may include two or more gateway nodes, wherein each of the gateway nodes may be integral or otherwise functionally associated with a caching unit. Each of the caching units may include: (a) a caching repository, (b) caching/delivery logic and (c) an inter-cache communication module. Caching logic of a given caching unit may include content characterization functionality for generating one or more characterization parameters (e.g. Content ID (CID) or fingerprint) associated with and/or derived from content entering a gateway node with which the given caching unit is integral or otherwise functionally associated. Content characterization parameters generated by a characterization module of a given caching unit may be compared, by an integral or otherwise functionally associated comparison module, with content characterization parameters of content already cached in: (a) one or more cache repositories of the given caching unit, and (b) one or more cache repositories of other caching units. According to further embodiments, a caching unit whose cache repository includes cached content with characterization parameters matching characterization parameters of the entering content may deliver the content with the matched parameters to an intended destination client device of the entering content. In the event a characterization parameter match for the entering content is not found on any of the caching units, one or more of the caching units may cache the entering content as it is being forwarded to an intended client device.

According to some embodiments of the present invention, the gateway network may employ load balanced caching, wherein load balancing includes actively selecting a caching unit, from the caching units in a gateway network, for caching content that has entered the network. According to further embodiments of the present invention, when a given gateway network node has more than one caching unit, the gateway network may maintain a database or list including updated capacity (e.g. available storage space) and data link quality (e.g. data link speed and/or available bandwidth) values for each caching unit. According to some embodiments of the present invention, the gateway network may decide to forward cacheable content to a caching unit with substantially the most available storage space and/or with substantially the highest quality data link. According to further embodiments of the present invention, a caching unit that has received a request to cache content may transmit, via an inter-cache communication module, a caching handoff request to another functionally associated cache. The caching handoff may include delegating caching responsibility to a functionally associated cache with more available storage capacity and/or a higher quality data link.

According to some embodiments of the present invention, the gateway network may employ load balanced content delivery, wherein load balancing includes actively selecting a caching unit, from the caching units in a gateway network, for forwarding cached content to an intended destination client device. According to further embodiments of the present invention, more than one caching unit may have content with characterization parameters matching characterization parameters of content intended for the destination client device. According to further embodiments of the present invention, a caching unit with the greatest link quality (e.g. link speed, available bandwidth and/or proximity to the destination client device) may be selected to deliver the matching content to the destination client device. In addition to optimizing delivery speed, load balanced content delivery may mitigate traffic over the core of the gateway network.

According to some embodiments of the present invention, functionally associated caching units may include inter-cache communication modules to transmit and receive caching requests and/or cached content. According to further embodiments of the present invention, a caching request may include transmitting characterization parameters of client-requested content to one or more functionally associated caching units for comparison with characterization parameters of content already cached in the one or more cache repositories of the functionally associated caching units. According to further embodiments of the present invention, a caching unit, whose cache repository includes cached content with characterization parameters matching characterization parameters of the client-requested content, may transmit the content to the caching unit that transmitted the caching request. According to some embodiments of the present invention, a caching request may include addressing information for the content-requesting client. According to further embodiments of the present invention, a caching unit whose cache repository includes cached content with characterization parameters matching characterization parameters of the client-requested content may transmit the content to the content-requesting client.

According to some embodiments of the present invention, characterization of content received by a gateway network node may include running a recognition algorithm on the requested content. The recognition algorithm may include calculating a checksum or a hash sum over one or more segments of the received content (e.g. over a data packet or a datagram). According to further embodiments of the present invention, the recognition algorithm may include a data packet inspection routine, wherein data packet inspection may include analyzing data associated with a received data packet. According to further embodiments of the present invention, data associated with the packet may include header data, addressing data, payload data and/or metadata.

According to some embodiments of the present invention, a caching unit associated with the gateway network may be configured as a network bridge when operating within the gateway network data flow or as a network data sniffer when operating from outside the network data flow. Caching units may operate on network data from any point along the network data flow.

According to some embodiments of the present invention, a caching unit integral or otherwise functionally associated with the gateway network may include one or more storage elements (e.g. internal, external and/or cloud based) for storing cached data. According to further embodiments of the present invention, the caching unit may include one or more storage elements for storing CID or fingerprint data paired with the cached data. According to further embodiments of the present invention, the CID or fingerprint data may be stored in substantially the same storage element.

According to some embodiments of the present invention, when a fingerprint of content entering the gateway network is matched to a fingerprint of content previously cached by a caching unit, the content source server may be instructed to drop the current session with the gateway network. The session may be continued by a storage element associated with the caching unit, wherein previously cached content may be routed from the storage element to the client device. According to some embodiments of the present invention, a proxy server associated with the caching unit may extract matched content from the storage element and stream the content to the client device using substantially the same content source addressing as the content source server. According to further embodiments of the present invention, the proxy server may employ spoofing, e.g. a Network Address Translation (NAT) routine to modify the content source address of the content. According to some embodiments of the present invention, the proxy server may extract matched content from the storage element and stream the content to the client device over a new session between the caching unit and the client device.

According to some embodiments of the present invention, when a fingerprint of requested content entering the gateway network does not match a fingerprint of previously cached content, the requested content may be routed to one or more storage elements associated with one or more caching units. According to some embodiments of the present invention, when the storage element(s) receive a predetermined percentage of the requested content, a session between a content source server and the client device may be terminated. According to further embodiments of the present invention, a proxy server associated with the caching unit(s) may extract requested content from the storage element(s) and stream the requested content to the client device over a new session between the caching unit(s) and the client device. According to some embodiments of the present invention, the proxy server may stream the content to the client device using substantially the same content source addressing as the content source server. According to further embodiments of the present invention, the proxy server may employ spoofing, e.g. a NAT routine to modify the content source address of the content.

According to some embodiments of the present invention, following a client device connection termination, requested content may be routed to a storage element in its entirety before closing a session with the content source server. According to some embodiments of the present invention, if a portion of requested content is missing in the storage element, the missing portion may be requested from the content source server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 shows a general system level diagram of a generalized communication and/or computer network including more than one caching unit, according to some embodiments of the present invention;

Figure 1:
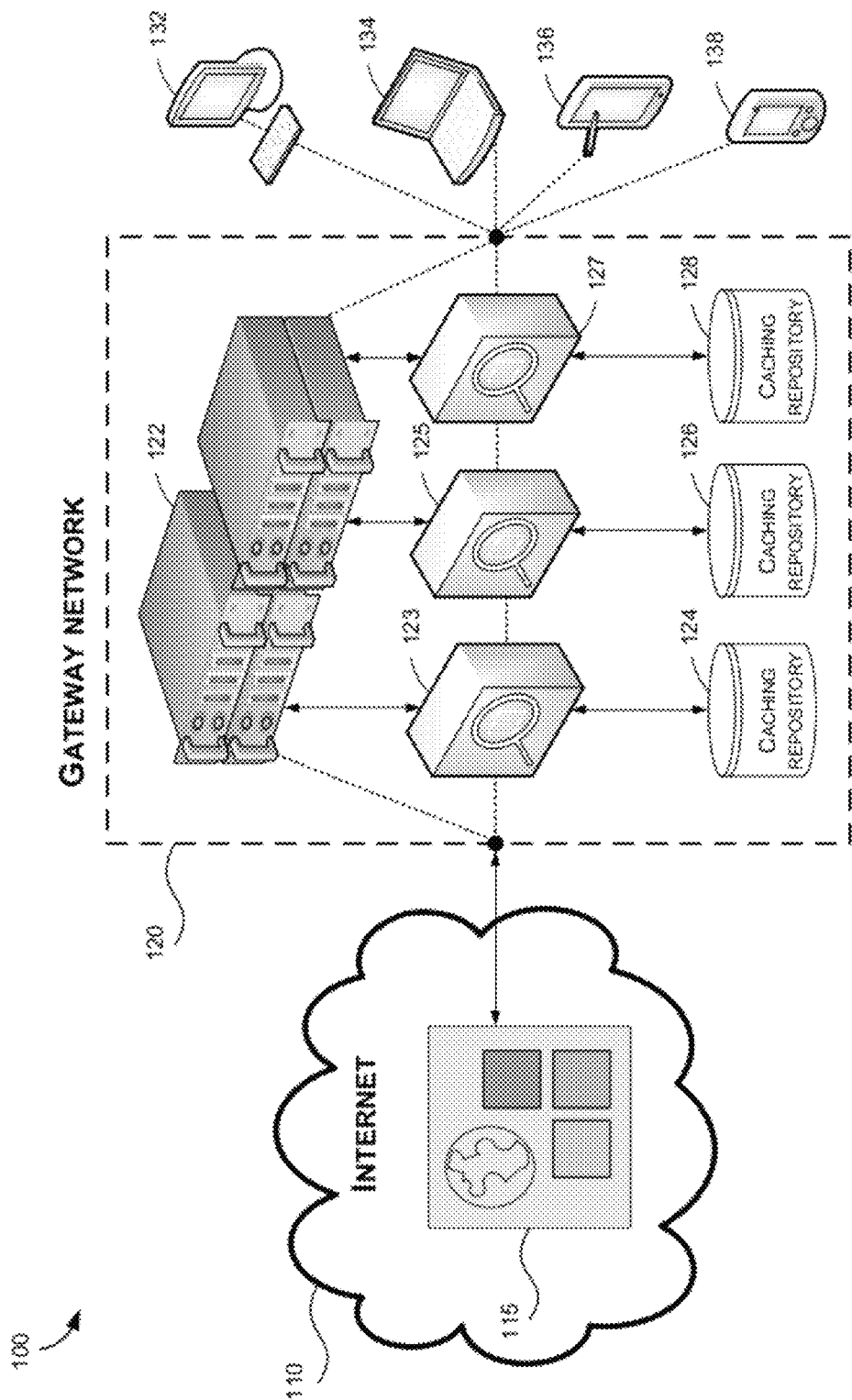
FIG. 1 shows a general system level diagram showing a content source, gateway network and client devices, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments, however, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (AN) receivers/transmitters, gaming consoles, video cameras, video recorders, portable media players, cell phones, mobile devices, and/or automobile AN accessories. In some demonstrative embodiments the methods, devices and/or systems disclosed herein may be used in the field of Personal Computers (PC), for example, as part of any suitable desktop PC, notebook PC, monitor, and/or PC accessories.

According to some embodiments of the present invention, there may be provided a caching unit functionally associated with a gateway node of an access network. The caching unit may comprise: (1) a content characterization module to generate one or more characterization parameters of content received from an external content source as the content enters the network through the gateway node; (2) a cache repository to store content and characterization information of the stored content; (3) a comparison module to compare generated characterization parameters with stored characterization parameters, wherein stored content whose characterization parameters match the generated characterization parameters may be termed a matched content entity; and (4) a communication module to provide inter-caching communication between the caching unit and an additional caching unit.

According to some embodiments of the present invention, the caching unit may further comprise a routing module configured to route a matched content entity to a client device associated with the gateway node. According to further embodiments of the present invention, the routing module may be further configured to terminate a session with the external content source substantially when the matched content entity is routed to the client device.

According to some embodiments of the present invention, received content with characterization parameters that do not match characterization parameters of content stored in said cache repository may be termed a locally non-matched content entity. According to further embodiments of the present invention, the communication module may be further configured to transmit a comparison request to one or more additional caching units, wherein an additional caching unit may compare the locally non-matched content entity with content stored on a cache repository associated with the additional caching unit. According to further embodiments of the present invention, content stored on a cache repository associated with an additional caching unit whose characterization parameters match characterization parameters of a locally non-matched content entity may be termed a remotely matched content entity.

According to some embodiments of the present invention, the communication module may be further configured to receive a remotely matched content entity from an additional caching unit. According to further embodiments of the present invention, the routing module may be further configured to route a remotely matched content entity to a client device associated with the gateway node. According to further embodiments of the present invention, the routing module may be further configured to terminate a session with the external content source substantially when the remotely matched content entity is routed to the client device.

According to some embodiments of the present invention, a locally non-matched content entity whose characterization parameters do not match characterization parameters of content stored on a cache repository associated with any additional caching unit may be termed a remotely non-matched content entity. According to further embodiments of the present invention, the routing module may be further configured to route the remotely non-matched content entity to the cache repository for storage. According to further embodiments of the present invention, the routing module may be further configured to route the remotely non-matched content entity to the client device in parallel with routing the remotely non-matched content entity to the cache repository. According to further embodiments of the present invention, the routing module may be further configured to route the remotely non-matched content entity to the client device after routing at least a portion of the remotely non-matched content entity to the cache repository. According to further embodiments of the present invention, the routing module may be further configured to terminate a session with the external content source substantially when the remotely non-matched content entity is routed to the client device. According to further embodiments of the present invention, the routing module may be further configured to continue a session with the external content source even when the client disconnects from the gateway network.

According to some embodiments of the present invention, there may be provided a gateway network comprising: a client device interface to receive a content request from a client device connected to the gateway network and to forward the requested content to the client device; and a content source interface to receive the requested content from an external content source. The gateway network may further comprise: a content caching unit comprising: (1) a content characterization module to generate one or more characterization parameters of received content; (2) a cache repository to store content and characterization information of the stored content; (3) a comparison module to compare generated characterization parameters with stored characterization parameters, wherein stored content whose characterization parameters match the generated characterization parameters may be termed a matched content entity and (4) a communication module to provide inter-caching communication between the caching unit and an additional caching unit.

According to some embodiments of the present invention, the caching unit may further comprise a routing module configured to route a matched content entity to the client device. According to further embodiments of the present invention, the routing module may be further configured to terminate a session with the external content source substantially when the matched content entity is routed to the client device.

According to some embodiments of the present invention, received content with characterization parameters that do not match characterization parameters of content stored in the cache repository may be termed a locally non-matched content entity. According to further embodiments of the present invention, the communication module may be further configured to transmit a comparison request to one or more additional caching units, wherein an additional caching unit compares the locally non-matched content entity with content stored on a cache repository associated with the additional caching unit.

According to some embodiments of the present invention, content stored on a cache repository associated with an additional caching unit whose characterization parameters match characterization parameters of a locally non-matched content entity may be termed a remotely matched content entity. According to further embodiments of the present invention, the communication module may be further configured to receive a remotely matched content entity from an additional caching unit. According to further embodiments of the present invention, the routing module may be further configured to route a remotely matched content entity to the client device. According to further embodiments of the present invention, the routing module may be further configured to terminate a session with the external content source substantially when the remotely matched content entity is routed to the client device.

According to some embodiments of the present invention, a locally non-matched content entity whose characterization parameters do not match characterization parameters of content stored on a cache repository associated with any additional caching unit may be termed a remotely non-matched content entity. According to further embodiments of the present invention, the routing module may be further configured to route the remotely non-matched content entity to the cache repository for storage. According to further embodiments of the present invention, the routing module may be further configured to route the remotely non-matched content entity to the client device in parallel with routing the remotely non-matched content entity to the cache repository. According to further embodiments of the present invention, the routing module may be further configured to route the remotely non-matched content entity to the client device after routing at least a portion of the remotely non-matched content entity to the cache repository. According to further embodiments of the present invention, the routing module may be further configured to terminate a session with the external content source substantially when the remotely non-matched content entity is routed to the client device. According to further embodiments of the present invention, the routing module may be further configured to continue a session with the external content source even when the client disconnects from the gateway network.

According to some embodiments of the present invention, there may be provided a method for a caching unit to cache content in a gateway network comprising: (1) receiving a content request from a client device connected to the gateway network; (2) requesting and receiving the requested content from an external content source and forwarding the requested content to the client device; (3) generating one or more characterization parameters of received content; (4) storing content and characterization information of the stored content; (5) comparing generated characterization parameters with stored characterization parameters, wherein stored content whose characterization parameters match the generated characterization parameters may be termed a matched content entity; and (6) communicating with an additional caching unit.

According to some embodiments of the present invention, the method may further comprise routing a matched content entity to the client device. According to further embodiments of the present invention, the method may further comprise terminating a session with the external content source substantially when the matched content entity is routed to the client device.

According to some embodiments of the present invention, received content with characterization parameters that do not match characterization parameters of locally stored content may be termed a locally non-matched content entity. According to further embodiments of the present invention, the method may further comprise transmitting a comparison request to one or more additional caching units, wherein an additional caching unit compares the locally non-matched content entity with content stored on a cache repository associated with the additional caching unit.

According to some embodiments of the present invention, content stored on a cache repository associated with an additional caching unit whose characterization parameters match characterization parameters of a locally non-matched content entity may be termed a remotely matched content entity. According to further embodiments of the present invention, the method may further comprise receiving a remotely matched content entity from an additional caching unit. According to further embodiments of the present invention, the method may further comprise routing a remotely matched content entity to the client device. According to further embodiments of the present invention, the method may further comprise terminating a session with the external content source substantially when the remotely matched content entity is routed to the client device.

According to some embodiments of the present invention, a locally non-matched content entity whose characterization parameters do not match characterization parameters of content stored on a cache repository associated with any additional caching unit may be termed a remotely non-matched content entity. According to further embodiments of the present invention, the method may further comprise routing the remotely non-matched content entity for local storage. According to further embodiments of the present invention, the method may further comprise routing the remotely non-matched content entity to the client device in parallel with routing the remotely non-matched content entity for local caching. According to further embodiments of the present invention, the method may further comprise routing the remotely non-matched content entity to the client device after routing at least a portion of the remotely non-matched content entity for local caching. According to further embodiments of the present invention, the method may further comprise terminating a session with the external content source substantially when the remotely non-matched content entity is routed to the client device. According to some embodiments of the present invention, the method may further comprise continuing a session with the external content source even when the client disconnects from the gateway network.

Now turning to FIG. 1, there is shown a general system level diagram (100) showing a content source, gateway network and client devices, according to some embodiments of the present invention.

According to some embodiments of the present invention, a content source (115) associated with a computer or communication network (e.g. the Internet 110) and external to a gateway network (120) may deliver content requested by a client device (e.g. computer 132, laptop 134, tablet 136 or smart phone 138) via a node of the gateway network (120) to the client. While forwarding the requested content to a client device, the requested content may pass through an integral or otherwise functionally associated content characterization-based caching unit nearest to the client device (127) to check for matching content on a local caching repository (128). According to further embodiments of the present invention, when matched content is found on the local caching repository (128), the matched content may be forwarded by the gateway network server (122) or the caching unit (127) to the client device via a node of the gateway network (120).

According to some embodiments of the present invention, when matched content is not found on the local caching repository (128), the caching unit (127) may transmit a matching request to additional caching units (123 & 125). The additional caching units (123 & 125) may check for matching content on associated remote caching repositories (124 & 126). According to further embodiments of the present invention, when matched content is found on any remote caching repository (124 or 126), the matched content may be forwarded by the the additional caching unit (123 or 125) to the client device via a node of the gateway network (120).

Figure 2A:
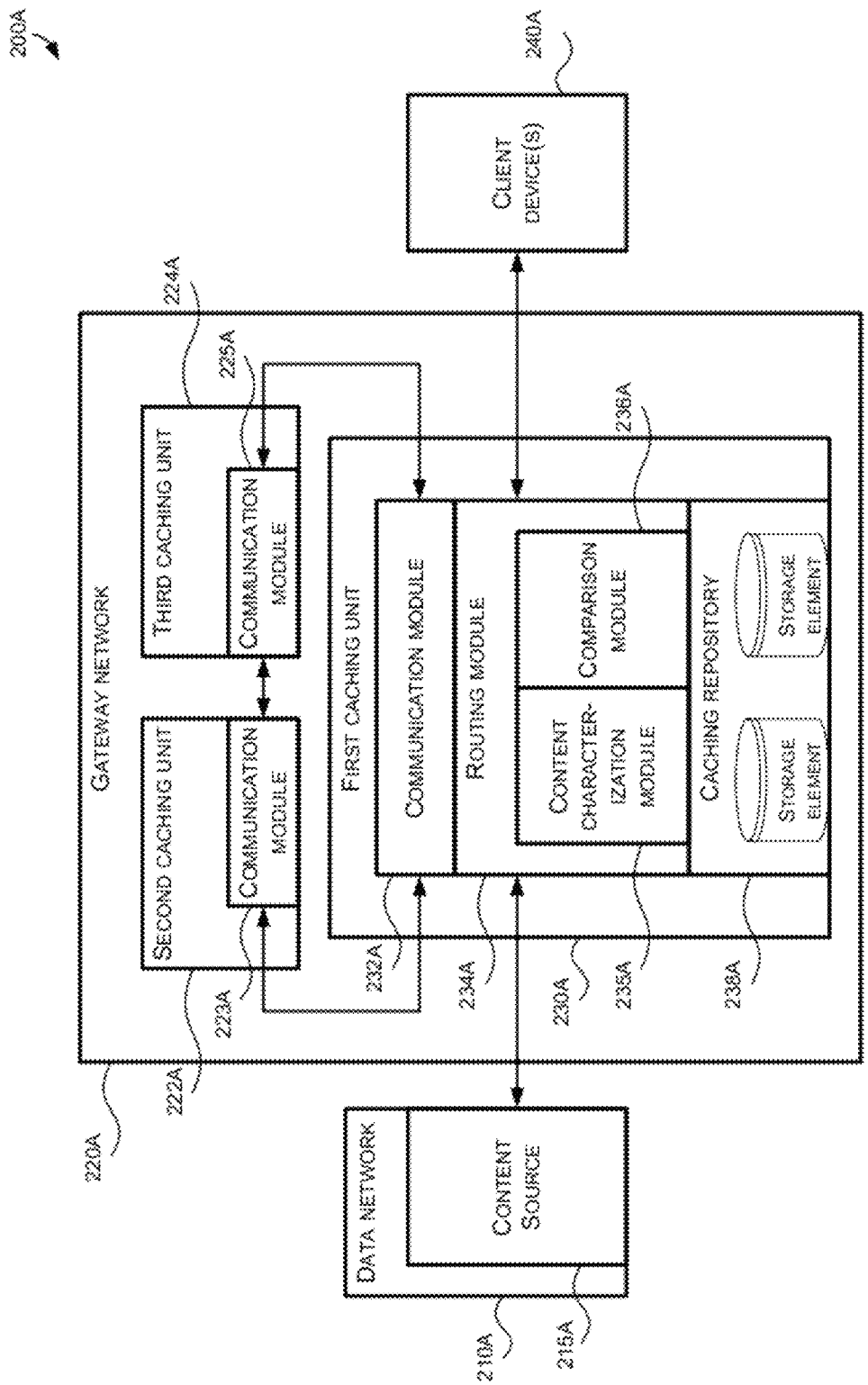
FIG. 2A shows a functional block diagram of a gateway network including more than one caching unit, according to some embodiments of the present invention.
Figure 2B:
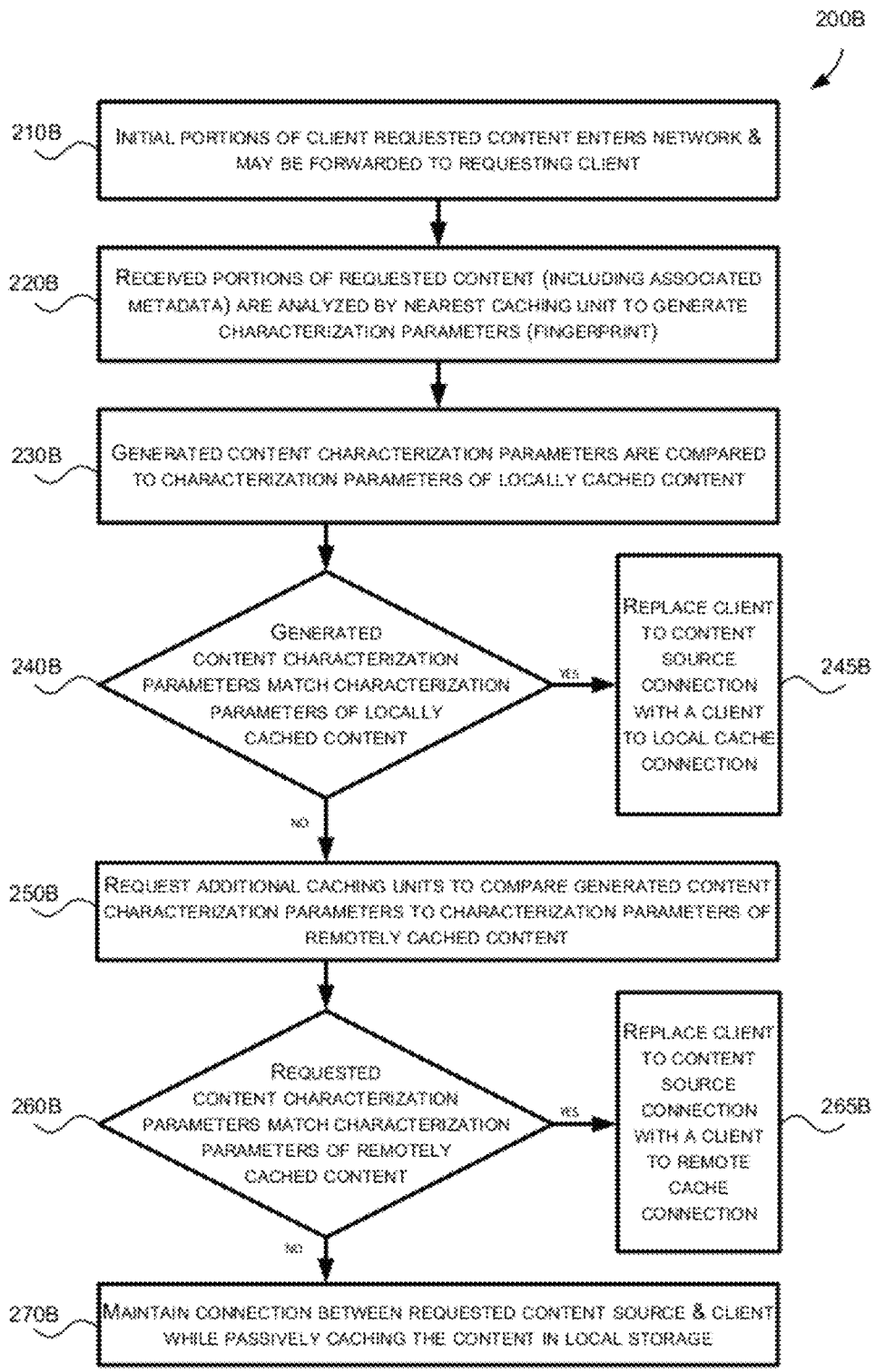
FIG. 2B is a flow chart including the steps of caching content flowing through a gateway network, according to some embodiments of the present invention.

Now turning to FIG. 2A, there is shown a functional block diagram (200A) of a gateway network (220A) including more than one caching unit, according to some embodiments of the present invention. The gateway network (220A) may be described in view of FIG. 2B showing a flow chart (200B) including the steps of caching content flowing through a gateway network (220A), according to some embodiments of the present invention.

According to some embodiments of the present invention, a client device (240A) may request content from a content source (215A) located on some external data network (210A). According to further embodiments of the present invention, initial portions of the client requested content may enter the network via a routing module (234A) of a first caching unit (230A) and may be forwarded to the requesting client (210B). According to some embodiments of the present invention, a content characterization module (235A) integral to the first caching unit (230A) may analyze (220B) received portions of requested content, in addition to associated metadata, and may generate (220B) characterization parameters (e.g. a content ID or fingerprint). According to further embodiments of the present invention, an integral or otherwise functionally associated comparison module (236A) may compare (230B) the generated content characterization parameters to characterization parameters of locally cached content. The locally cached content may be stored in an integral or functionally associated caching repository (238A) containing one or more storage elements.

According to some embodiments of the present invention, when requested content characterization parameters match characterization parameters of locally cached content (240B), a connection between the requested content source (215A) and the client (240A) may be replaced (245B) with a connection between the local caching repository (238A) and the client. According to further embodiments of the present invention, the routing module (234A) may forward a copy of the cached data to the client device (240A).

According to some embodiments of the present invention, when requested content characterization parameters do not match characterization parameters of locally cached content (240B), the first caching unit (230A) may transmit a request (250B), via an integral or otherwise functionally associated communication module (232A), to additional caching units (e.g. second caching unit 222A and/or third caching unit 224A etc.) to compare generated content characterization parameters to characterization parameters of content remotely cached on the additional caching units. According to further embodiments of the present invention, when requested content characterization parameters match characterization parameters of remotely cached content (260B), a connection between the requested content source (215A) and the client (240A) may be replaced (265B) with a connection between the remote caching repository (e.g. located on second caching unit 222A or third caching unit 224A) and the client (240A).

According to some embodiments of the present invention, when requested content characterization parameters do not match characterization parameters of remotely cached content (260B), a connection between the requested content source (215A) and the client (240A) may be maintained (270B) while passively caching the content. According to further embodiments of the present invention, the routing module (234A) may route a copy of the requested content, along with associated characterization data to the caching repository (238A) for local storage.

Now turning to FIG. 3, there is shown a general system level diagram of a generalized communication and/or computer network (300) including more than one caching unit (340), according to some embodiments of the present invention.

According to some embodiments of the present invention, content may be requested from the internet (310) by a client or terminal connected to an access point (350). The Access point (350) may be connected to a caching unit (340). The caching unit (340) may be connected to a core network infrastructure (320) via an access network infrastructure (330).

According to further embodiments of the present invention, a caching unit (340) may analyze incoming requested content and characterize the content based on its data contents and/or metadata. According to some embodiments of the present invention, if the requested content characterization matches a characterization of previously cached content, the previously cached content may be forwarded to the terminal (350) from the caching unit. According to further embodiments of the present invention, if the requested content characterization does not match a characterization of previously cached content, the caching unit may request matching content from another functionally associated cache located within the network (340). According to further embodiments of the present invention, if the requested content characterization matches a characterization of previously cached content on another caching unit (340), the cached content may be forwarded to the terminal (350) from that caching unit. If no matches are found, the requested content may be stored in a local caching unit in parallel to or substantially after the terminal receives the requested content.

Figure 4A:
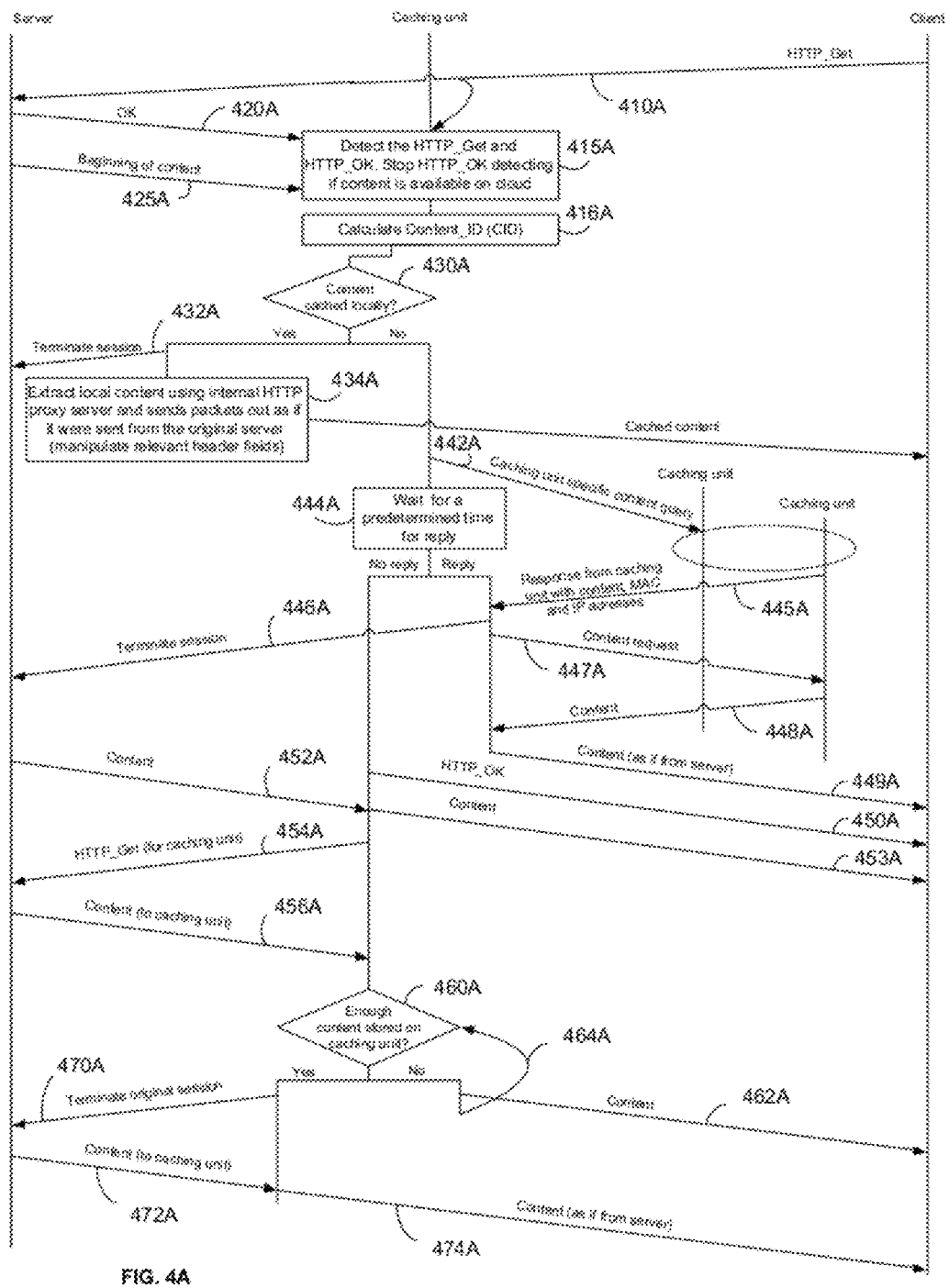
FIG. 4A is a flow chart including the steps of distributed content caching and delivery, according to embodiments of the present invention where a caching unit employs spoofing, i.e. Network Address Translation (NAT) routine for cached content.

Now turning to FIG. 4A there is shown a flow chart including the steps of distributed content caching and delivery, according to embodiments of the present invention where a caching unit employs spoofing, i.e. Network Address Translation (NAT) routine for cached content.

According to some embodiments of the present invention, a client may issue an HTTP_Get command to an associated server (410A) to request content. The server may commence a session with a local caching unit (420A). The content request, in addition to some or all of the received content may pass through a local caching unit and/or may be sniffed by a local caching unit (415A). The caching unit may buffer received data (425A) while generating a content identification (CID) unique to the received data (416A). The caching unit may use the CID to check if content substantially identical to the client requested content is already locally cached (430A). If the requested content is already in the local caching unit, the session with the server may be terminated (432A) and content may be sent from the local caching unit to the client (434A).

According to some embodiments of the present invention, if the requested content is not in the local caching unit, the local caching unit may transmit a caching unit specific content query to additional caching units located in the network (442A). If the requested content is found on an additional caching unit, the additional caching unit may send a content address, a MAC address and/or an IP address to the local caching unit (445A). According to further embodiments of the present invention, the session with the server may be terminated (446A) and a content request may be sent from the local caching unit to the additional caching unit (447A). According to further embodiments of the present invention, the additional caching unit may send the content to the local caching unit (448A) which may employ a NAT routine to send the content to the client (449A).

According to some embodiments of the present invention, if the requested content is not found on an additional caching unit, an HTTP_OK command may be sent to the client (450A). The caching unit may receive the requested content and may buffer the content (452A) while transmitting the content to the client (453A). The buffered content may be forwarded to the client and the rest of the content may be sent from the originally requested server to the client. The local caching unit may cache the content in a passive mode in parallel to it being sent to the client. The caching unit may send an HTTP_Get request to the server (454A) and may receive the content from the server for caching (456A). According to further embodiments of the present invention, the caching unit may store the content in parallel with sending the packets to the client (462A) until the end of the content file (464A). According to further embodiments of the present invention, when enough content has been stored on the caching unit (460A), the session with the server may be terminated (470A). If specific data is missing from the file, the missing data may be retrieved from the server via a new session (472A) and transmitted to the client (474A).

Figure 4B:
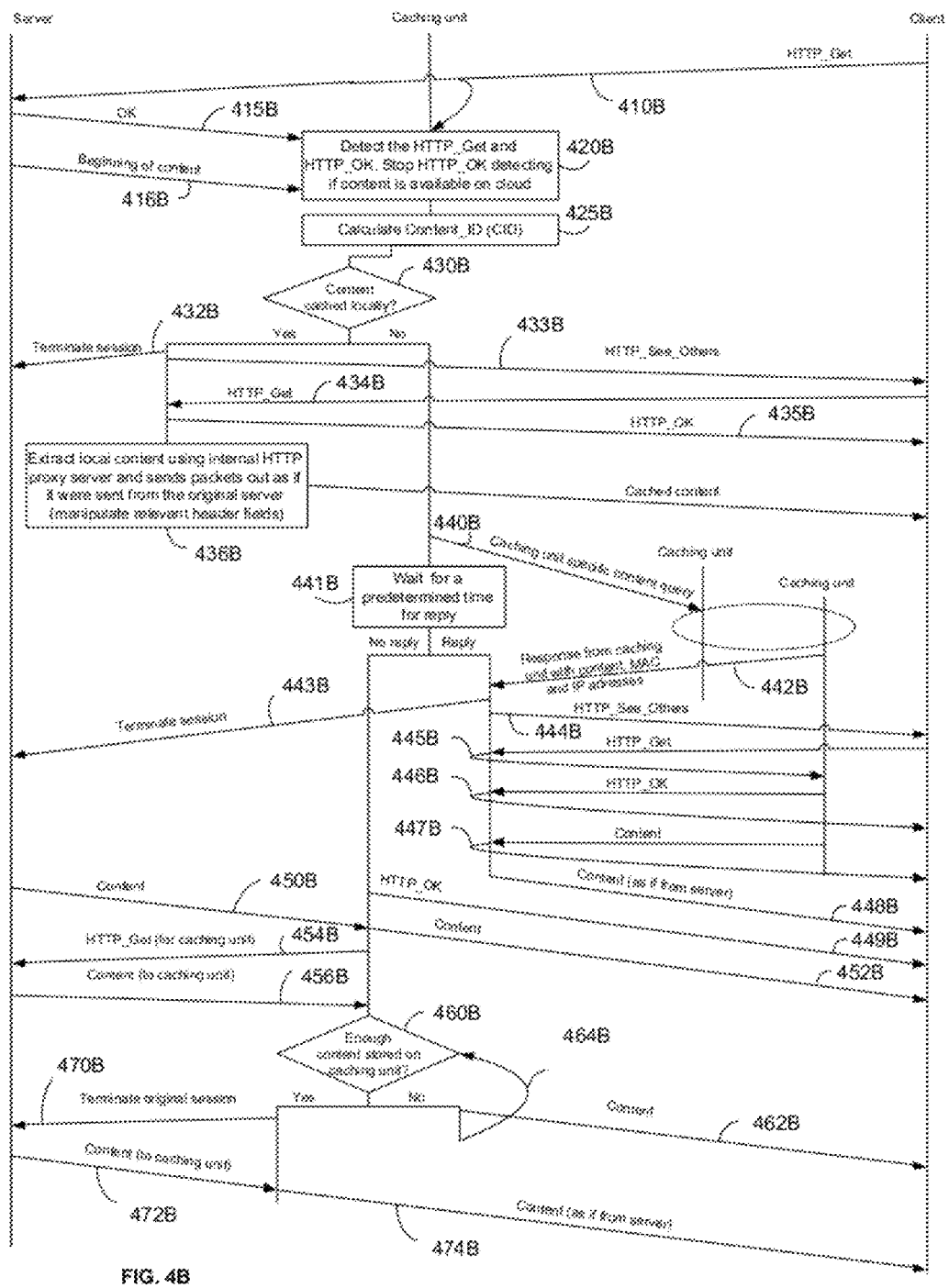
FIG. 4B is a flow chart including the steps of distributed content caching and delivery, according to embodiments of the present invention where a caching unit opens a new session with a client.

Now turning to FIG. 4B there is shown a flow chart including steps of distributed content caching and delivery, according to embodiments of the present invention where a caching unit opens a new session with a client.

According to some embodiments of the present invention, a client may issue an HTTP_Get command to an associated server (410B) to request content. The server may commence a session with a local caching unit (415B). The content request, in addition to some or all of the received content may pass through a local caching unit and/or may be sniffed by a local caching unit (420B). The caching unit may buffer received data (416B) while generating a content identification (CID) unique to the received data (425B). The caching unit may use the CID to check if content substantially identical to the client requested content is already locally cached (430B). If the requested content is already in the local caching unit, the session with the server may be terminated (432B) and a new session between the caching unit and the client may be initiated (433B-435B). According to further embodiments of the present invention, the content may be sent from the local caching unit to the client (436B) using an internal proxy server. The local caching unit may employ a NAT routine to send the content to the client.

According to some embodiments of the present invention, if the requested content is not in the local caching unit, the local caching unit may transmit a caching unit specific content query to additional caching units located in the network (440B). If the requested content is found on an additional caching unit, the additional caching unit may send a content address, a MAC address and/or an IP address to the local caching unit (442B). According to further embodiments of the present invention, the session with the server may be terminated (443B) and an HTTP_See_Others request may be sent from the local caching unit to the client (444B). An HTTP_Get may be sent to the local caching unit which may be forwarded to the additional caching unit (445B). According to further embodiments of the present invention, the additional caching unit may send an HTTP_OK to the local caching unit which may be forwarded to the client (446B). The HTTP_OK may be followed by a requested content transmission (447B). Any additional and/or lost content may be forwarded by the local caching unit to the client (448B).

According to some embodiments of the present invention, if the requested content is not found on an additional caching unit, the local caching unit may receive the requested content and may buffer the content (450B) while transmitting the content to the client (452B). The buffered content may be forwarded to the client and the rest of the content may be sent from the originally requested server to the client. The local caching unit may cache the content in a passive mode in parallel to it being sent to the client. The caching unit may send an HTTP_Get request to the server (454B) and may receive the content from the server for caching (456B). According to further embodiments of the present invention, the caching unit may store the content in parallel with sending the packets to the client (462B) until the end of the content file (464B). According to further embodiments of the present invention, when enough content has been stored on the caching unit (460B), the session with the server may be terminated (470B). If specific data is missing from the file, the missing data may be retrieved from the server via a new session (472B) and transmitted to the client (474B).

Figure 5A:
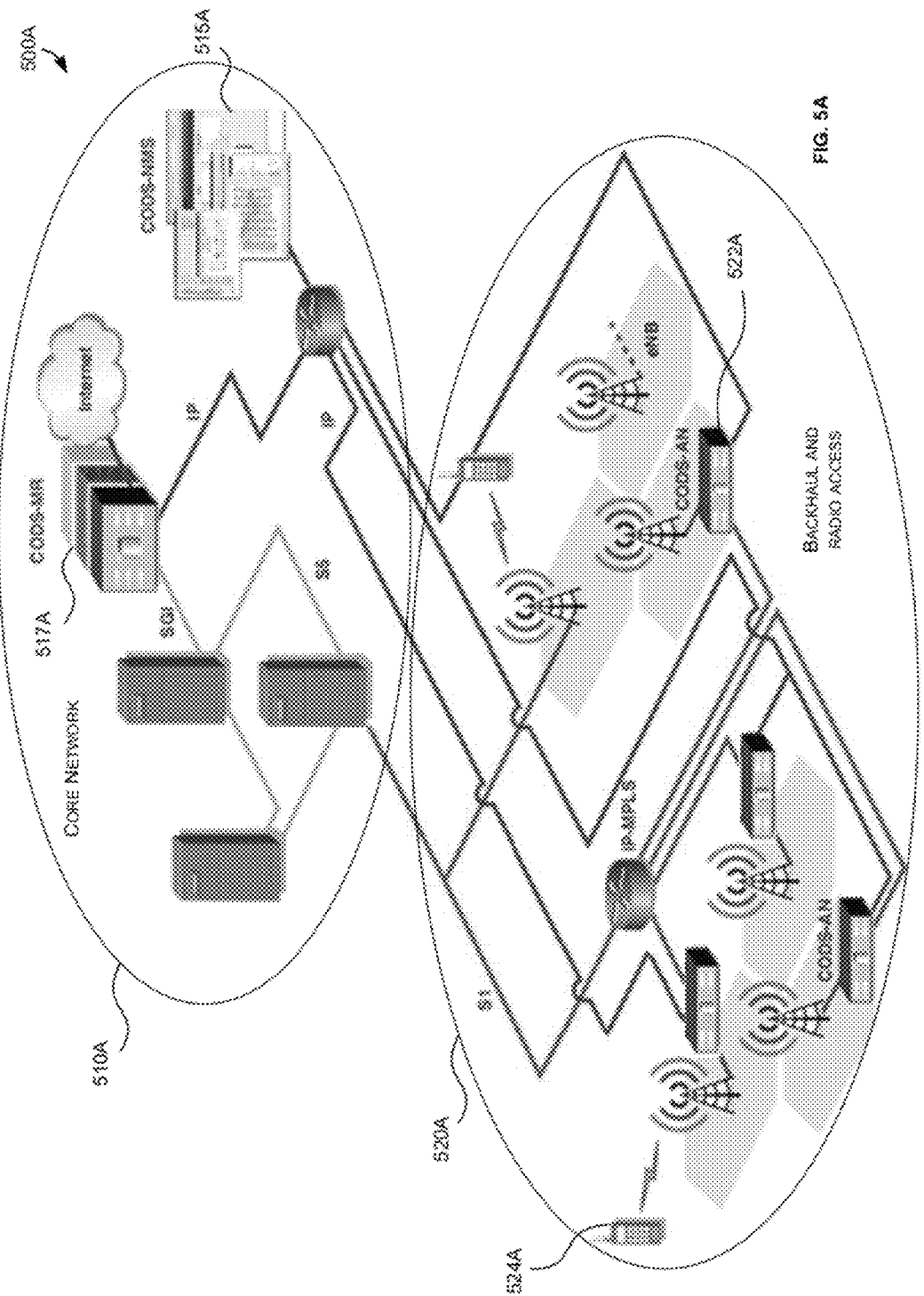
FIG. 5A shows a general system level diagram of a distributed content caching and delivery system in a high speed mobile network (e.g. WiMAX, LTE, 4G) according to some embodiments of the invention.

Now turning to FIG. 5A there is shown a general system level diagram of a distributed content caching and delivery system in a high speed mobile network (500A) (e.g. 4G, LTE, WiMAX), according to some embodiments of the invention. The high speed mobile network may include a core network infrastructure (510A) and a backhaul and radio access infrastructure (520A).

According to some embodiments of the present invention, a mobile user (524A) may request content via a connecting base station in the backhaul and radio access infrastructure (520A). The request may be detected by a content caching and delivery management (515A) placed inside the core network infrastructure (510A). According to further embodiments of the present invention, the content caching and delivery management (515A) may than analyze the content being transmitted by a streaming and/or web server (517A) towards the mobile user and generate a fingerprint based on the content and associated metadata. According to further embodiments of the present invention, the content caching and delivery management (515A) may compare the fingerprint to previously cached content. If there is a match, the matched cached content may be forwarded to the mobile user (524A) via the backhaul and radio access infrastructure (520A). If there is no match, the content caching and delivery management (515A) may request matching content from additional caching units (e.g. caching unit 522A) located in the network. If there is a match, the matched cached content may be forwarded to the mobile user (524A) via the backhaul and radio access infrastructure (520A). According to further embodiments of the present invention, if there is no match, a caching unit (e.g. caching unit 522A) may store the content in addition to forwarding the content to the mobile user (524A).

According to some embodiments of the present invention, a caching unit (522A) may be located in the backhaul and radio access (520A) adjacent to one or more base station elements or aggregation points.

Figure 5B:
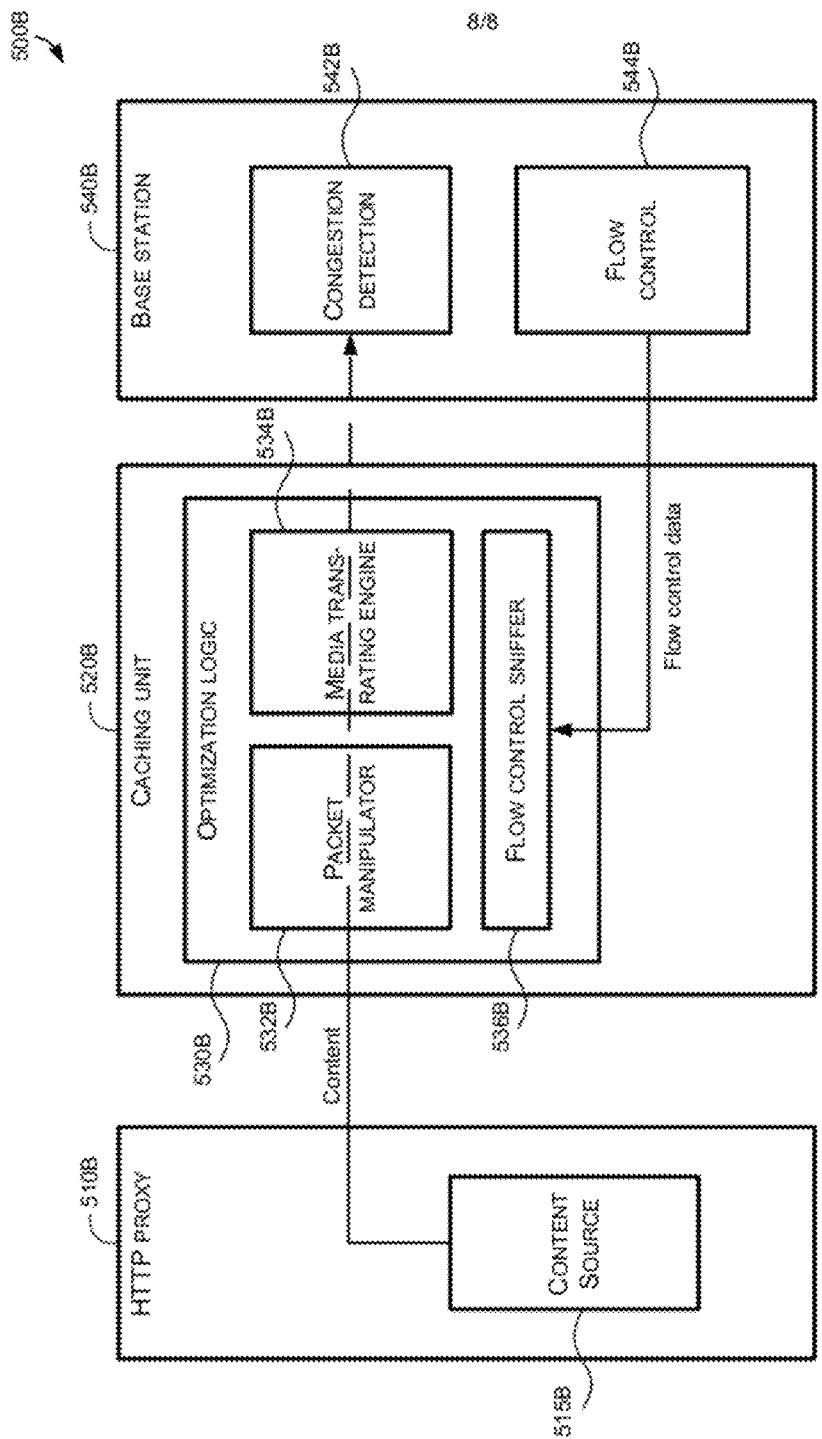
FIG. 5B shows a functional block diagram of a cross layer optimizer, according to some embodiments of the present invention.

Now turning to FIG. 5B there is shown a functional block diagram of a cross layer optimizer (500B), according to some embodiments of the present invention.

According to some embodiments of the present invention, a caching unit (520B) may comprise optimization logic (530B) for optimizing data flow through the caching unit. According to some embodiments of the present invention, the optimization logic (530B) may include a flow control sniffer (536B) to analyze flow control or cell utilization information, received from a functionally associated base station (540B), and to generate a flow-based and/or user-based value. The optimization logic (530B) may control a bit-rate of content streaming from a content source (515B) located on an integral or otherwise functionally associated HTTP proxy (510B). According to further embodiments of the present invention, a media transrating engine (534B) may adjust the bit-rate of content before forwarding the content to a functionally associated base station (540B), for a content requesting client. The adjusted bit-rate may be matched to a current maximum bit-rate of a client downlink. According to further embodiments of the present invention, a scheduler, integral to or otherwise functionally associated with the media transrating engine (534B), may adjust the bit-rate based substantially on overall network conditions. A bit stream may be given priority based on parameters relating to the downlink (e.g. type of application, required bit-rate and/or required QOS) and/or based on a specific application related to the content.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A caching unit functionally associated with a gateway node of an access network, said unit comprising:
    a content characterization module to generate one or more characterization parameters of content received from an external content source, as the content enters said network through said gateway node;
    a cache repository to store content and characterization parameters of the stored content;
    a comparison module to compare generated characterization parameters with stored characterization parameters, wherein stored content whose characterization parameters match the generated characterization parameters is termed a matched content entity;
    a communication module to provide inter-caching communication between said caching unit and an additional caching unit; and
    a routing module configured to route a matched content entity to a client device associated with said gateway node and terminate a session with the external content source substantially when the matched content entity is routed to the client device.

2. The caching unit according to claim 1, wherein received content with characterization parameters that do not match characterization parameters of content stored in said cache repository is termed a locally non-matched content entity.

3. The caching unit according to claim 2, wherein said communication module is further configured to transmit a comparison request to one or more additional caching units, wherein an additional caching unit compares the locally non-matched content entity with content stored on a cache repository associated with the additional caching unit.

4. The caching unit according to claim 3, wherein content stored on a cache repository associated with an additional caching unit whose characterization parameters match characterization parameters of a locally non-matched content entity is termed a remotely matched content entity.

5. The caching unit according to claim 4, wherein said communication module is further configured to receive a remotely matched content entity from an additional caching unit.

6. The caching unit according to claim 5, wherein said routing module is further configured to route a remotely matched content entity to a client device associated with said gateway node.

7. The caching unit according to claim 6, wherein said routing module is further configured to terminate a session with the external content source substantially when the remotely matched content entity is routed to the client device.

8. The caching unit according to claim 3, wherein a locally non-matched content entity whose characterization parameters do not match characterization parameters of content stored on a cache repository associated with any additional caching unit is termed a remotely non-matched content entity.

9. The caching unit according to claim 8, wherein said routing module is further configured to route the remotely non-matched content entity to said cache repository for storage.

10. The caching unit according to claim 9, wherein said routing module is further configured to route the remotely non-matched content entity to the client device in parallel with routing the remotely non-matched content entity to said cache repository.

11. The caching unit according to claim 9, wherein said routing module is further configured to route the remotely non-matched content entity to the client device after routing at least a portion of the remotely non-matched content entity to said cache repository.

12. The caching unit according to claim 11, wherein said routing module is further configured to terminate a session with the external content source substantially when the remotely non-matched content entity is routed to the client device.

13. The caching unit according to claim 9, wherein said routing module is further configured to continue a session with the external content source even when the client disconnects from the gateway network.

14. A gateway network comprising:
a client device interface to receive a content request from a client device connected to the gateway network and to forward the requested content to the client device;
a content source interface to receive the requested content from an external content source;
a content caching unit comprising: (1) a content characterization module to generate one or more characterization parameters of received content; (2) a cache repository to store content and characterization parameters of the stored content; (3) a comparison module to compare generated characterization parameters with stored characterization parameters, wherein stored content whose characterization parameters match the generated characterization parameters is termed a matched content entity and (4) a communication module to provide inter-caching communication between said caching unit and an additional caching unit; and
a routing module configured to route a matched content entity to the client device and terminate a session with the external content source substantially when the matched content entity is routed to the client device.

15. The gateway network according to claim 14, wherein received content with characterization parameters that do not match characterization parameters of content stored in said cache repository is termed a locally non-matched content entity.

16. The gateway network according to claim 15, wherein said communication module is further configured to transmit a comparison request to one or more additional caching units, wherein an additional caching unit compares the locally non-matched content entity with content stored on a cache repository associated with the additional caching unit.

17. The gateway network according to claim 16, wherein content stored on a cache repository associated with an additional caching unit whose characterization parameters match characterization parameters of a locally non-matched content entity is termed a remotely matched content entity.

18. The gateway network according to claim 17, wherein said communication module is further configured to receive a remotely matched content entity from an additional caching unit.

19. The gateway network according to claim 18, wherein said routing module is further configured to route a remotely matched content entity to the client device.

20. The gateway network according to claim 19, wherein said routing module is further configured to terminate a session with the external content source substantially when the remotely matched content entity is routed to the client device.

21. The gateway network according to claim 16, wherein a locally non-matched content entity whose characterization parameters do not match characterization parameters of content stored on a cache repository associated with any additional caching unit is termed a remotely non-matched content entity.

22. The gateway network according to claim 21, wherein said routing module is further configured to route the remotely non-matched content entity to said cache repository for storage.

23. The gateway network according to claim 22, wherein the routing module is further configured to route the remotely non-matched content entity to the client device in parallel with routing the remotely non-matched content entity to said cache repository.

24. The gateway network according to claim 22, wherein the routing module is further configured to route the remotely non-matched content entity to the client device after routing at least a portion of the remotely non-matched content entity to said cache repository.

25. The gateway network according to claim 24, wherein the routing module is further configured to terminate a session with the external content source substantially when the remotely non-matched content entity is routed to the client device.

26. The gateway network according to claim 22, wherein the routing module is further configured to continue a session with the external content source even when the client disconnects from the gateway network.

27. A method for a caching unit to cache content in a gateway network comprising:
- receiving a content request from a client device connected to the gateway network;
- requesting and receiving the requested content from an external content source and forwarding the requested content to the client device;
- generating one or more characterization parameters of received content;
- storing content and characterization parameters of the stored content;
- comparing generated characterization parameters with stored characterization parameters, wherein stored content whose characterization parameters match the generated characterization parameters is termed a matched content entity;
- communicating with an additional caching unit;
- routing a matched content entity to the client device; and
- terminating a session with the external content source substantially when the matched content entity is routed to the client device.

28. The method according to claim 27, wherein received content with characterization parameters that do not match characterization parameters of locally stored content is termed a locally non-matched content entity.

29. The method according to claim 28, further comprising transmitting a comparison request to one or more additional caching units, wherein an additional caching unit compares the locally non-matched content entity with content stored on a cache repository associated with the additional caching unit.

30. The method according to claim 29, wherein content stored on a cache repository associated with an additional caching unit whose characterization parameters match characterization parameters of a locally non-matched content entity is termed a remotely matched content entity.

31. The method according to claim 30, further comprising receiving a remotely matched content entity from an additional caching unit.

32. The method according to claim 31, further comprising routing a remotely matched content entity to the client device.

33. The method according to claim 32, further comprising terminating a session with the external content source substantially when the remotely matched content entity is routed to the client device.

34. The method according to claim 29, wherein a locally non-matched content entity whose characterization parameters do not match characterization parameters of content stored on a cache repository associated with any additional caching unit is termed a remotely non-matched content entity.

35. The method according to claim 34, further comprising routing the remotely non-matched content entity for local storage.

36. The method according to claim 35, further comprising routing the remotely non-matched content entity to the client device in parallel with routing the remotely non-matched content entity for local caching.

37. The method according to claim 35, further comprising routing the remotely non-matched content entity to the client device after routing at least a portion of the remotely non-matched content entity for local caching.

38. The method according to claim 37, further comprising terminating a session with the external content source substantially when the remotely non-matched content entity is routed to the client device.

39. The method according to claim 35, further comprising continuing a session with the external content source even when the client disconnects from the gateway network.

* * * * *

UNITED STATES PATENT AND TRADEMARK OFFICE
CERTIFICATE OF CORRECTION

PATENT NO. : 8,812,609 B2  
APPLICATION NO. : 13/324160  
DATED : August 19, 2014  
INVENTOR(S) : Frydman et al.

Page 1 of 1

It is certified that error appears in the above-identified patent and that said Letters Patent is hereby corrected as shown below:

On the Title page,
Item [73], "Jaguna Networks Ltd." should read -- Saguna Networks Ltd. --

Signed and Sealed this
Third Day of February, 2015

Michelle K. Lee
*Deputy Director of the United States Patent and Trademark Office*